United States Patent
Coady et al.

(10) Patent No.: US 12,001,920 B2
(45) Date of Patent: Jun. 4, 2024

(54) GENERATING A GLOBAL SNAPSHOT OF A QUANTUM COMPUTING DEVICE

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

(*) Notice: Subject to any disclaimer, the term of this patent is extended or adjusted under 35 U.S.C. 154(b) by 456 days.

(21) Appl. No.: 17/460,949

(22) Filed: Aug. 30, 2021

(65) Prior Publication Data

US 2023/0066093 A1    Mar. 2, 2023

(51) Int. Cl.
*G06N 10/00*      (2022.01)
*G06F 9/455*      (2018.01)
*G06F 40/143*     (2020.01)

(52) U.S. Cl.
CPC ............ *G06N 10/00* (2019.01); *G06F 9/455* (2013.01); *G06F 40/143* (2020.01)

(58) Field of Classification Search
CPC ........ G06N 10/00; G06N 10/20; G06N 10/40; G06N 10/80; G06F 9/455; G06F 40/143
USPC ........................................................ 716/100
See application file for complete search history.

(56) References Cited

U.S. PATENT DOCUMENTS

| | | | |
|---|---|---|---|
| 8,972,237 | B2 | 3/2015 | Wecker |
| 10,176,276 | B2 | 1/2019 | Chao et al. |
| 10,469,087 | B1 | 11/2019 | Granade et al. |
| 10,970,234 | B2 | 4/2021 | Nation et al. |
| 2019/0251213 | A1* | 8/2019 | Bishop ................... G06N 10/00 |
| 2020/0250566 | A1 | 8/2020 | Majumdar |
| 2023/0090148 | A1* | 3/2023 | Gamble, IV ........... G06N 10/40 |
| | | | 716/100 |

FOREIGN PATENT DOCUMENTS

WO       2020047426 A1     3/2020

OTHER PUBLICATIONS

Ball, H. et al., "Software tools for quantum control: Improving quantum computer performance through noise and error suppression," Jul. 4, 2020, https://arxiv.org/ftp/arxiv/papers/2001/2001.04060.pdf, 56 pages.
Matsuura, S. et al., "Variationally Scheduled Quantum Simulation," arXiv:2003.09913v2, Apr. 27, 2021, https://arxiv.org/pdf/2003.09913.pdf, 16 pages, Apr. 29, 2021.

* cited by examiner

*Primary Examiner* — Paul Dinh
(74) *Attorney, Agent, or Firm* — Dority & Manning, P.A.

(57) ABSTRACT

Generating a global snapshot of a quantum computing device is provided herein. In particular, a quantum snapshot service receives a system snapshot configuration with a snapshot parameter associated with a snapshot condition of the quantum computing device. The quantum snapshot service determines a first occurrence of the snapshot condition in relation to operation of the quantum computing device executing at least two quantum services. The quantum snapshot service generates a first global snapshot of the quantum computing device that captures system level performance of the quantum computing device executing the at least two quantum services. The first global snapshot includes a global operating parameter and a global operating tag associated with the global operating condition. The quantum snapshot service sends the first global snapshot to a classical snapshot service.

20 Claims, 7 Drawing Sheets

GENERATING A GLOBAL SNAPSHOT OF A QUANTUM COMPUTING DEVICE

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

SUMMARY

The examples disclosed herein provide generating a global snapshot of a quantum computing device. In particular, a quantum snapshot service receives a system snapshot configuration with a snapshot parameter associated with a snapshot condition of the quantum computing device. The quantum snapshot service determines a first occurrence of the snapshot condition in relation to operation of the quantum computing device executing at least two quantum services. The quantum snapshot service generates a first global snapshot of the quantum computing device that captures system level performance of the quantum computing device executing the at least two quantum services. The first global snapshot includes a global operating parameter and a global operating tag associated with the global operating condition. The quantum snapshot service sends the first global snapshot to a classical snapshot service. In certain implementations, the first global snapshot is subsequently used by a simulation controller of a classical computing device to simulate an operating condition of a quantum computing device.

In one example, a method is provided. The method includes receiving, by a quantum snapshot service of a quantum computing device, a system snapshot configuration. The system snapshot configuration includes a snapshot parameter associated with a snapshot condition of the quantum computing device. The method further includes determining, by the quantum snapshot service, a first occurrence of the snapshot condition in relation to operation of the quantum computing device executing at least two quantum services. The method further includes generating, by the quantum snapshot service, a first global snapshot of the quantum computing device. The first global snapshot captures system level performance of the quantum computing device executing the at least two quantum services. The first global snapshot includes a global operating parameter representing a global operating condition of the quantum computing device. The first global snapshot further includes a global operating tag associated with the global operating condition. The method further includes sending, by the quantum snapshot service, the first global snapshot to a classical snapshot service.

In another implementation, a system is disclosed. The system includes a quantum computing device, which includes a processor device to receive, by a quantum snapshot service of the quantum computing device, a system snapshot configuration, the system snapshot configuration including a snapshot parameter associated with a snapshot condition of the quantum computing device. The processor device further to determine, by the quantum snapshot service, a first occurrence of the snapshot condition in relation to operation of the quantum computing device executing at least two quantum services. The processor device further to generate, by the quantum snapshot service, a first global snapshot of the quantum computing device. The first global snapshot captures system level performance of the quantum computing device executing the at least two quantum services. The first global snapshot includes a global operating parameter representing a global operating condition of the quantum computing device. The first global snapshot further includes a global operating tag associated with the global operating condition. The processor device further to sending, by the quantum snapshot service, the first global snapshot to a classical snapshot service.

In another implementation, a computer program product is disclosed. The computer program product is stored on a non-transitory computer-readable storage medium and includes instructions to cause a processor device to receive, by a quantum snapshot service of a quantum computing device, a system snapshot configuration, the system snapshot configuration including a snapshot parameter associated with a snapshot condition of the quantum computing device. The instructions further cause the processor device to determine, by the quantum snapshot service, a first occurrence of the snapshot condition in relation to operation of the quantum computing device executing at least two quantum services. The instructions further cause the processor device to generate, by the quantum snapshot service, a first global snapshot of the quantum computing device. The first global snapshot captures system level performance of the quantum computing device executing the at least two quantum services. The first global snapshot includes a global operating parameter representing a global operating condition of the quantum computing device. The first global snapshot further includes a global operating tag associated with the global operating condition. The instructions further cause the processor device to send, by the quantum snapshot service, the first global snapshot to a classical snapshot service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
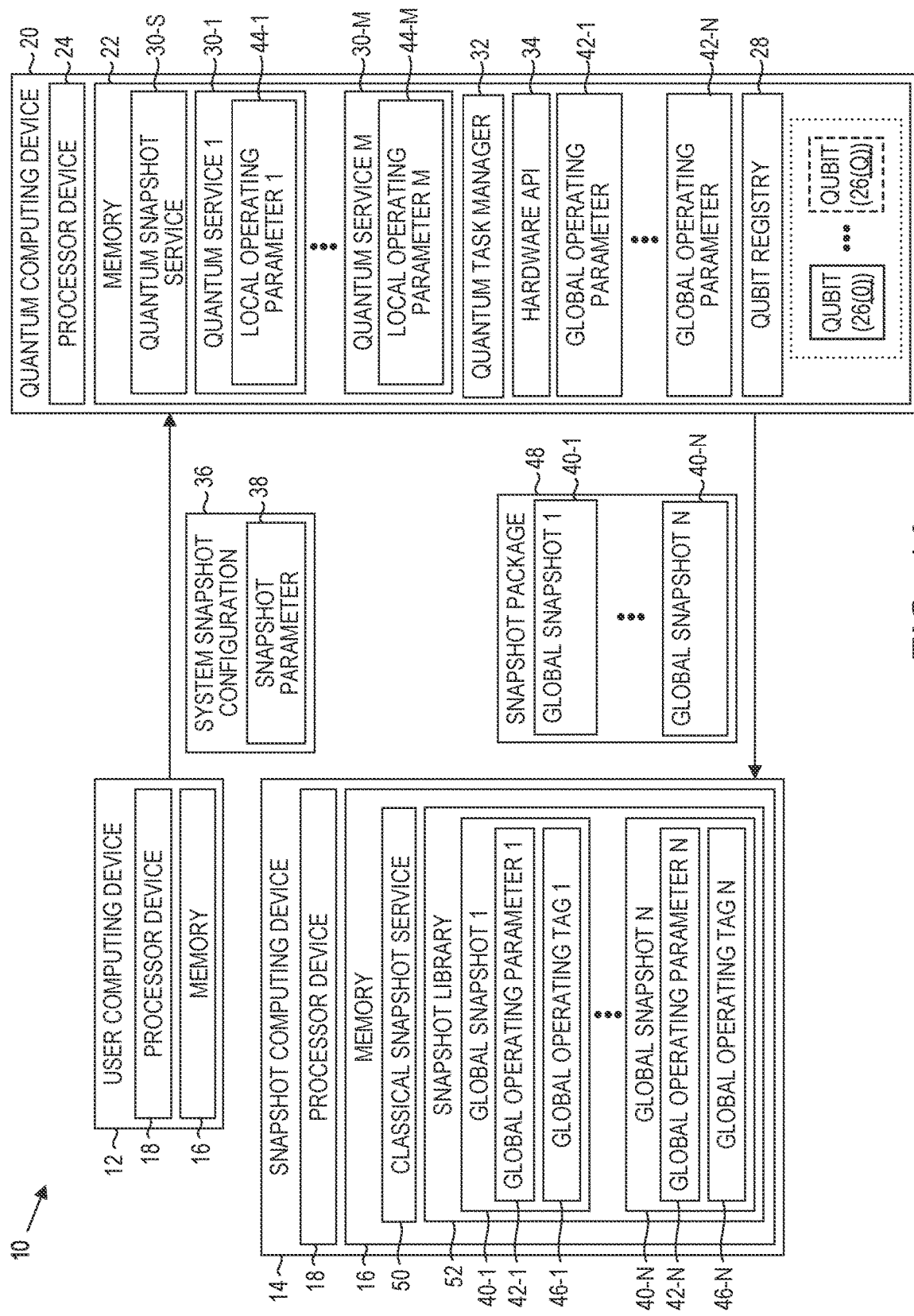
FIG. 1A is a block diagram of a system to capture a global snapshot of a quantum computing device according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Because qubits generally require very specific environmental conditions for operation, monitoring of a quantum computing device at a system level may be beneficial, such as to perform diagnostics, calibration, fine tuning, monitoring, or the like. For example, a quantum computing device may suffer from performance degradation over time. In this way, it would be beneficial to automatically capture an entirety of the quantum computing device for a more holistic understanding of performance of the quantum computing device at an instant and/or over time.

In this regard, the examples disclose a quantum snapshot service to automatically generate global snapshots of the quantum computing device according to a snapshot configuration. These global snapshots provide a system level overview of the quantum computing device, rather than a local view of quantum services executed by the quantum computing device. The global snapshots capture the overall performance of the quantum computing device (e.g., overall processing load, overall qubit usage, or the like), rather than local performance by a quantum service on the quantum computing device (e.g., service processing load, service qubit usage, or the like). Such global snapshots may be used for diagnostics, fine tuning, calibration, fine tuning, monitoring, or the like.

The term "snapshot," which may also be referred to as a "profile snapshot," as used herein refers generally to the mechanism by which a particular computer architecture implements the ability to concurrently maintain multiple different chronological states of an entity, such as a storage unit or a virtual machine. The term "snapshot" as used herein, when used as a command or operation, refers to the generation, at a particular instance in time, of information that preserves the current state of the entity being snapshotted.

FIG. 1A is a block diagram of a computing system 10 according to one example. The computing system 10 includes a user computing device 12 and a snapshot computing device 14, which are classical computing devices including a memory 16 and a processor device 18. The computing system 10 includes a quantum computing device 20 that includes a system memory 22 and a processor device 24. The user computing device 12, the snapshot computing device 14, and/or the quantum computing device 20 are all communicatively coupled via a classical communications link (not shown), which may include a private network or a public network such as the internet. It is to be understood that the computing system 10, according to some examples, may include other quantum computing devices and/or classical computing devices that are not illustrated in FIG. 1A. Additionally, the user computing device 12, the snapshot computing device 14, and/or the quantum computing device 20 in some examples may include constituent elements in addition to those illustrated.

In the example of FIG. 1A, the quantum computing device 20 implements a set of one or more qubits 26(0)-26(Q) for use by quantum services executed by the quantum computing device 20. To maintain information for the qubit(s) 26(0)-26(Q), the quantum computing device 20 may include a qubit registry 28, which includes a plurality of qubit registry entries each corresponding to a qubit such as the one or more qubits 26(0)-26(Q). The qubit registry 28 maintains and provides access to data relating to the qubits implemented by the quantum computing device 20, such as a count of the total number of qubits implemented by the quantum computing device 20 and a count of the number of available qubits that are currently available for allocation, as non-limiting examples. Each of the qubit registry entries of the qubit registry 28 also stores qubit metadata for a corresponding qubit 26. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 20 executes one or more quantum services, such as a quantum snapshot service 30-S and/or quantum services 30-1-30-M (referred to generally as quantum service 30). The quantum service 30 is a process that executes on a quantum computing device and employs qubits 26(0)-26(Q) to provide desired functionality. The quantum service 30 is defined using a quantum service definition, such as provided by a quantum assembly (QASM) file, which includes one or more quantum programming instructions. QASM is a programming language that specifies quantum circuits as input to a quantum computer by declaring classical bits and qubits and describing operations on the qubits and measurements needed to obtain a classical result based on the qubits.

Execution of quantum services 30 is facilitated by a quantum task manager 32, which handles operations for creating, monitoring, and terminating quantum services. The quantum task manager 32 may provide an interface (not shown) through which other services or tasks may request specific information regarding the qubits 26(0)-26(Q), the quantum service 30, and/or the quantum computing device 20. Additionally, information regarding the status and functionality of the quantum computing device 20 and the elements thereof may be made accessible to other processes via a hardware application programming interface (API) 34.

The user computing device 12 transmits a system snapshot configuration 36, may also be referred to as a snapshot configuration, to the quantum snapshot service 30-S of the quantum computing device 20. The system snapshot configuration 36 may include a snapshot parameter 38 for indicating the circumstances upon which the quantum snapshot service 30-S should take a global snapshot 40-1-40-N, referred to generally as a global snapshot 40. In particular, the snapshot parameter 38 may be compared to a global operating parameter 42-1-42-N, referred to generally as global operating parameter 42.

In certain implementations, the snapshot parameter 38 may be time-based, load-based, and/or event-based. Time-based snapshot parameters 38 may include a time, time period, time frequency, and/or time duration. For example, time-based snapshot parameters 38 may indicate that the quantum snapshot service 30-S should take a global snapshot 40 every second, every millisecond, and/or at a particular time every day. Load-based snapshot parameters 38 may include processing load, qubit usage, application queue length, or the like. For example, load-based snapshot parameters 38 may include a low processing load threshold, a high processing load threshold, a low qubit usage threshold, a high qubit usage threshold, a low application queue threshold, a high application queue threshold, or the like. Event-based snapshot parameters 38 may include operating temperature, or the like. For example, event-based snapshot parameters 38 may include a low operating temperature threshold, a high operating temperature threshold, or the like.

The global operating parameter 42 represents a real-time operating parameter that indicates a current operating condition of the quantum computing device 20. The global operating parameter 42 may include, for example, at least one of a time, time period, processing load, available memory, count of executing processes, application queue, qubit usage, count of available qubits 26(0)-26(Q), and/or operating temperature, or the like. In particular, for example, the global operating parameter 42 may include at least one of a memory usage indicator that indicates memory usage, a processor usage indicator that indicates processor usage, one or more qubit identifiers corresponding to one or more qubits, or one or more qubit data values corresponding to the one or more qubits.

Comparatively, quantum services 30-S may include local operating parameters 44-1-44-M, referred to generally as local operating parameters 44. Global operating parameters 42 reflect overall performance of the quantum computing device 20 (e.g., overall processing load, overall qubit usage, or the like), while local operating parameters 44 reflect local performance of a quantum service on the quantum computing device (e.g., service processing load, service qubit usage, or the like).

The global operating parameter 42 may be obtained from the quantum task manager 32 of the quantum computing device 20 and/or may be obtained via the hardware API 34 provided by the quantum computing device 20. Some examples may provide that the operating parameter 42 represents a historical operating parameter that indicates a previous operating condition of the quantum computing device 20. This may be the case if the quantum snapshot service 30-S determines to wait before taking the global snapshot 40, such as if the quantum computing device 20 is experiencing high load. It is to be understood that, while FIG. 1A illustrates only a single operating parameter 42, some examples may provide that multiple operating parameters corresponding to multiple operating conditions of the quantum computing device 20 are used to take one or more global snapshots 40. In such examples, the multiple operating parameters 42 may be received at a same point in time, or may be received over a time interval.

The quantum snapshot service 30-S determines, based on the system snapshot configuration 36, that a global snapshot 40 is to be taken for the quantum computing device 20. As a non-limiting example, the quantum snapshot service 30-S may make the determination by employing a rules engine that provides rules for comparing the snapshot parameter 38 of the system snapshot configuration 36 with a corresponding global operating parameter 42 of the quantum computing device 20. In certain implementations, the quantum snapshot service 30-S compares the snapshot parameter 38 to a global operating parameter 42 to determine whether to take a global snapshot 40. Thus, for instance, the global operating parameter 42 may include a current operating temperature of the quantum computing device, which may be compared to a snapshot parameter 38 that specifies a threshold or range of operating temperatures for the quantum computing device 20 to determine whether to take a global snapshot 40.

Once the quantum snapshot service 30-S determines that a global snapshot 40 should be taken, the quantum snapshot service 30-S determines whether the global snapshot 40 should be taken at the current instant or a future instant. For example, the quantum snapshot service 30-S may determine that currently the quantum computing device 20 is experiencing high resource usage, a high number of applications in the application queue, or the like. In such circumstances, the quantum snapshot service 30-S may determine to wait to take the global snapshot 40 until a future time when such constraints fall below a predetermined threshold. In certain implementations, the quantum snapshot service 30-S may interrogate the qubit registry 28 to determine an entanglement status of qubits 26(0)-26(Q) of the quantum computing device 20, to determine service ownership of qubits 26(0)-26(Q) of the quantum computing device 20, and/or to determine current usage of qubits 26(0)-26(Q) of the quantum computing device 20, or the like.

Once the quantum snapshot service 30-S determines that a global snapshot 40 should be taken and determines a convenient time to take the global snapshot 40, the quantum snapshot service 30-S proceeds with taking the global snapshot 40. The global snapshot 40 may include at least one of an XML (Extensible Markup Language) file, a YAML (YAML Ain't Markup Language) file, or a JSON (JavaScript Object Notation) file. The global snapshot 40 may include, as non-limiting examples, an indication of a state, condition, and/or operation of the quantum computing device. For example, the global snapshot 40 may capture such global operating conditions as system load, system response time, operating temperature, state of the qubits (e.g., qubit age, coherence time, and/or the like), or the like.

The global snapshot 40 may include one or more global operating parameters 42 and one or more associated global operating tags 46. For example, the global snapshot 40 may include a global operating parameter 42 that reflects a high temperature state of the quantum computing device 20 and a global operating tag 46-1-42-N, referred to generally as a global operating tag 46, that indicates the same. The global operating tag 46 is associated with and reflective of the global operating condition, where the global operating tag 46 includes at least one of a time, time period, low processing load, high processing load, low qubit usage, high qubit usage, low operating temperature, high operating temperature, low application queue, or high application queue. As another example, the global snapshot 40 includes global operating parameters 42 indicating high resource usage and high temperature, along with global operating tags 46 also indicating high resource usage and high temperature.

In certain implementations, the quantum snapshot service 30-S may take more global snapshots 40. For example, the quantum snapshot service may determine a second occurrence of the snapshot condition in relation to operation of the quantum computing device 20 executing at least two quantum services 30. The quantum snapshot service then generates a second global snapshot 40 of the quantum computing device 20. The quantum snapshot service 30-S sends the second global snapshot 40 to a classical snapshot service 50.

The quantum snapshot service 30-S may take any number of global snapshots 40. The quantum snapshot service 30-S then sends one or more global snapshots 40 in a snapshot package 48 to the classical snapshot service 50 of the snapshot computing device 14. The classical snapshot service 50 stores the global snapshot 40 in a snapshot library 52. The snapshot library 52 may be a classical data repository, which may include a conventional classical database or a file system on a conventional classical persistent data store such as a hard drive, as non-limiting examples.

The classical snapshot service 50 thereby provides a comprehensive collection of global snapshots 40 that reflect various operating states and conditions of the quantum computing device 20. Such global snapshots 40 may be used for diagnostics, fine tuning, calibration, fine tuning, monitoring, or the like. For example, global snapshots 40 may be used at key points in the lifecycle of the quantum computing device 20, thereby allowing for finer tuning of a quantum service to optimize for the lifecycle and reality of quantum hardware. In particular, the global snapshots 40 may be used to simulate operating conditions of the quantum computing device 20.

Figure 1B:
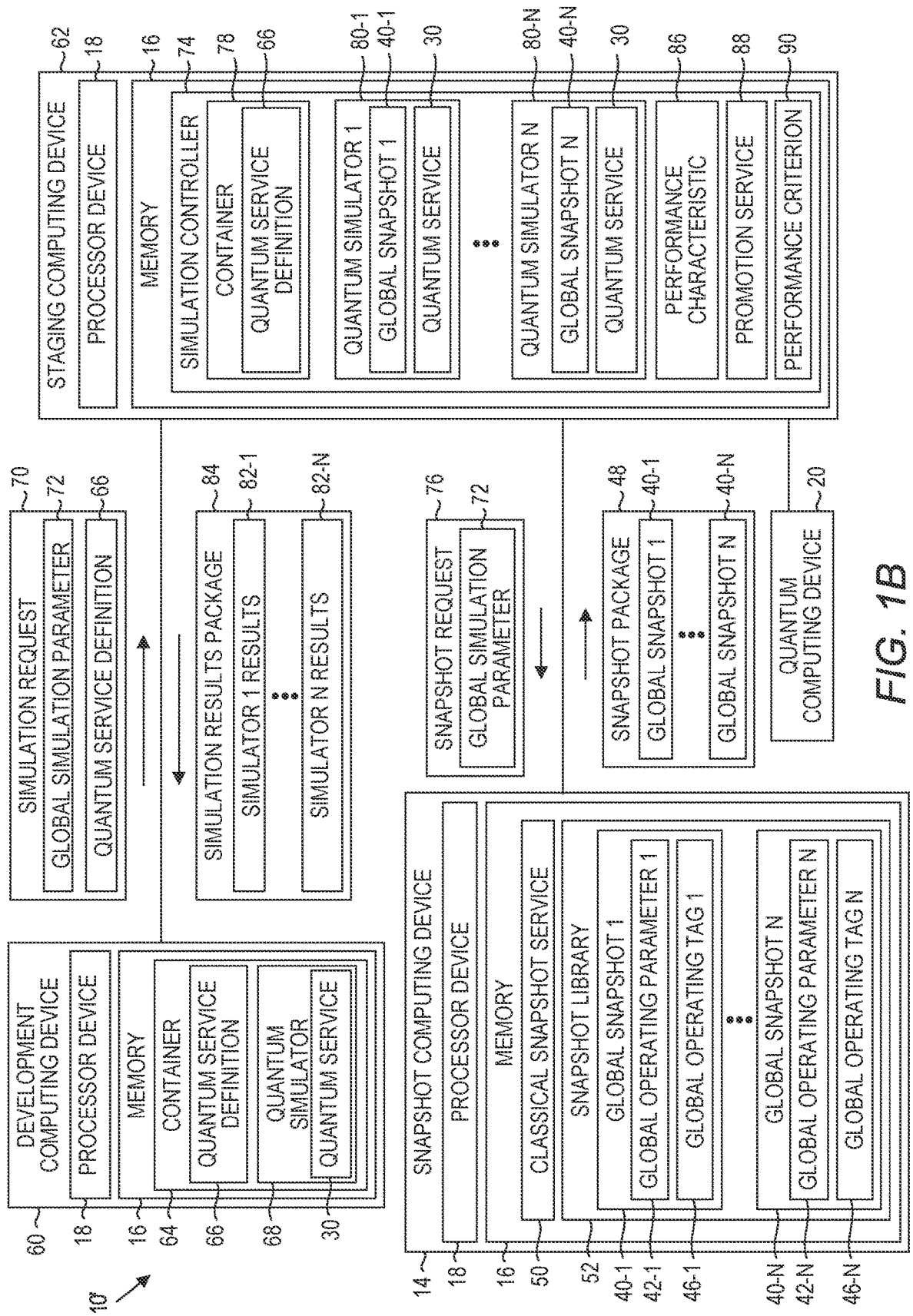
FIG. 1B is a block diagram of a system to simulate an operating condition of the quantum computing device using the global snapshot of the quantum computing device according to one example.

FIG. 1B is a block diagram of a computing system 10' to simulate an operating condition of the quantum computing device 20 using the global snapshot 40 of the quantum computing device 20 according to one example. The computing system 10' includes the snapshot computing device 14, a development computing device 60, and/or a staging computing device 62, which are classical computing device that each include a system memory 16 and a processor device 18. The computing system 10' may further include the quantum computing device 20 (as illustrated in FIG. 1A). The quantum computing device 20, the snapshot computing device 14, the development computing device 60, and the staging computing device 62 are all communicatively coupled via a classical communications link (not shown), which may comprise a private network or a public network such as the internet. It is to be understood that the computing system 10', according to some examples, may include other quantum computing devices and/or classical computing devices that are not illustrated. Additionally, the quantum computing device 20, the snapshot computing device 14, the development computing device 60, and/or the staging computing device 62 in some examples may include constituent elements in addition to those illustrated.

Because qubits such as the qubits 26(0)-26(Q) (see FIG. 1A) generally require very specific environmental conditions for operation, development of quantum services 30 (see FIG. 1A) generally is not performed on the quantum computing device 20, but rather is performed on a separate device such as the development computing device 60. Quantum runs can vary significantly depending on operating conditions of the quantum computing device 20, such as processing load, temperature variance, maintenance schedule, implementation strategy, or the like. Accordingly, it is desirable to test a quantum service 30 according to various operating conditions before executing the quantum service 30 on the quantum computing device 20.

The development computing device 60 provides a container 64, which may be provided by a convention application container framework such as Docker. The container 64 provides an operating environment that is isolated from other processes executing on the development computing device 60, and to which predefined levels of system resources (e.g., memory, processor cycles, system bandwidth, and the like) of the development computing device 60 may be allocated.

Within the container 64, a quantum service definition 66 that defines the quantum service 30 may be generated and revised using conventional development tools (not shown). The quantum service definition 66 may then be provided to a quantum simulator 68, such as the Qiskit quantum computing framework, which is an open-source framework that provides tools for creating and manipulating quantum programs and services and simulating execution of the quantum programs and services on classical computing devices. The quantum simulator 68 is capable of taking as input a QASM file, and simulating quantum operations or computations in a manner that may recreate the functionality of a quantum service 30. Within the quantum simulator 68, the quantum service 30 is executed based on the quantum service definition 66. Based on the performance of the quantum service 30 within the quantum simulator 68, the quantum service definition 66 may be further refined and tested until it is determined to be suitable for promotion to the quantum computing device 20. It is to be understood that, while FIG. 1B illustrates only a single container 64, the development computing device 60 may provide multiple containers. Upon reaching a desired level of confidence in the performance of the quantum service 30 in the quantum simulator 68, the quantum service definition 66 may be transferred to and executed by a quantum computing device 20 as the quantum service 30 (see FIG. 1A).

However, this approach to development of quantum services may suffer from disadvantages. In particular, differences in the operating conditions of the quantum computing device 20 and the development computing device 60 may result in the quantum service 30 performing suboptimally on the quantum computing device 20. Additionally, the transition of the quantum service 30 from the container 64 of the development computing device 60 to the quantum computing device 20 may be inconsistent with the developer workflow based on the use of containers such as the container 64. Accordingly, an ability to perform development and testing of quantum services under operating conditions that mirror actual or historical operating conditions of the quantum computing device 20 prior to deployment will be desirable.

In this regard, the development computing device 60, or user computing device 12 (see FIG. 1A), transmits a simulation request 70 to the staging computing device 62. The simulation request 70 may include a global simulation parameter 72 and/or a quantum service definition 66. The global simulation parameter 72 represents one or more global operating conditions of the quantum computing device 20 that the user would like to simulate. The quantum service definition 66 defines the quantum service 30 that the user would like to test in the simulated quantum computing device 20.

The staging computing device 62 includes a simulation controller 74 to implement a quantum simulator 80 for simulating operating conditions of the quantum computing device 20 for developing and testing the quantum service 30. As used herein, the term "quantum simulator" refers to functionality provided by a classical computing device for employing a quantum service definition 66 to simulate the execution of a corresponding quantum service 30.

The simulation controller 74 retrieves the global snapshot 40 based on the global operating tag 46. In particular, the simulation controller 74 sends a snapshot request 76, which may include the global simulation parameter 72, to the classical snapshot service 50 of the snapshot computing device 14. The classical snapshot service 50 then reviews the snapshot library 52 and retrieves global snapshots 40 that meet the snapshot request 76. For example, the classical snapshot service 50 utilizes the global operating tags 46 to identify and retrieve global snapshots 40 that meet the global simulation parameter 72. In certain implementations, for example, the global simulation parameter 72 may request simulating high load conditions. The classical snapshot service 50 reviews the global operating tags 46 for those global snapshots 40 that include high load conditions. The classical snapshot service 50 then generates a snapshot package 48 with the selected global snapshots 40 that meet the snapshot request 76. It is noted that the snapshot package 48 may include only a subset of the global snapshots 40 stored in the snapshot library 52.

Upon receipt of the global snapshots 40, the simulation controller 74 creates a simulation for each global snapshot 40. In particular, for example, the simulation controller 74 creates a container 78 with the quantum service definition 66. The quantum service definition 66 in some examples may be received by a container 78, which provides an operating environment and development tools in a manner similar to the container 64 of the development computing device 60. In certain implementations, the simulation controller 74 creates a container 78 for each global snapshot 40 retrieved.

The simulation controller 74 generates a quantum simulator 80 based on the global snapshots 40 retrieved. In particular, for each global snapshot 40 retrieved, a corresponding quantum simulator 80 is created. The quantum simulator 80 simulates the global operation condition of the quantum computing device 20 based on the global operating parameter 42 (see FIG. 1A). Each quantum simulator 80 accesses the quantum service definition 66 from the container 78 to execute the quantum service 30 in the quantum simulator 80. As non-limiting examples, each of the quantum simulators 80 may be simulating a different high load condition captured by real world operation of the quantum computing device 20. The simulation controller 74 executes the quantum service 30 in each quantum simulator 80 under the simulated global operating condition based on the quantum service definition 66.

In certain implementations, each quantum simulator 80 is based on only one global snapshot 40. Each quantum simulator 80 is based on only one global operating parameter 42 of only one global snapshot 40. In other implementations, each quantum simulator 80 may be based on a plurality of global snapshots 40. Each quantum simulator 80 may be based on a plurality of global operating parameters 42 of a plurality of global snapshots 40.

In some examples, the staging computing device 62 may further measure one or more performance characteristics 86 of the quantum service 30 during execution by the quantum simulator 80. The performance characteristic 86 may comprise any attribute of the quantum service 30 measurable by the quantum simulator 80, and may include, as non-limiting examples, execution speed of the quantum service 30, system resource consumption by the quantum service 30, results generated by the quantum service 30, errors generated by the quantum service 30, and the like.

The simulation controller 74 receives simulator results 82-1-82-N, referred to generally as simulator results 82, of executing the quantum service 30 in the quantum simulators 80. The simulator results 82 may include performance characteristics 86 and/or other information, such as information specific to the global snapshot 40 associated with the performance characteristics 86. The simulation controller 74 generates a simulation results package 84 including one or more simulator results 82, and then sends the simulation results package 84 to the development computing device 60, or user computing device, over a network.

Based on the measuring of the performance characteristic 86, the quantum service definition 66 in some examples may be modified. For example, the quantum service definition 66 may be modified in response to manually provided user input (e.g., a developer may edit the quantum service definition 66), or may be automatically modified by the staging computing device 62. In this manner, the quantum service definition 66 can be updated based on the performance of the quantum service 30 under the simulated operating condition provided by the quantum simulator 80.

Some examples may provide that the staging computing device 62 further implements a promotion service 88 for determining whether the quantum service 30 is suitable for promotion to the production environment provided by the quantum computing device 20, and for performing operations for promoting the quantum service 30. In such examples, a performance criterion 90 is provided to specify a desired threshold for the performance characteristic 86, or an average of the performance characteristic 86 across multiple quantum simulators 80. It is to be understood that, in examples in which multiple performance characteristics 86 are measured, corresponding multiple performance criterion 90 may be provided. After the performance characteristic 86 is measured, the promotion service 88 may determine that the performance characteristic 86 satisfies the performance criterion 90. The promotion service 88 then transfers the quantum service definition 66 to the quantum computing device 20, and initiates execution of the quantum service 30 by the quantum computing device 20 based on the quantum service definition 66.

It is to be understood that, because the quantum simulator 80 and the promotion service 88 are components of the staging computing device 62, functionality implemented by the quantum simulator 80 and the promotion service 88 may be attributed to the computing system 10' generally. Moreover, in examples where the quantum simulator 80 and the promotion service 88 comprise software instructions that program the processor device 18 to carry out functionality discussed herein, functionality implemented by the quantum simulator 80 and the promotion service 88 may be attributed herein to the processor device 18. It is to be further understood that while, for purposes of illustration only, the quantum simulator 80 and the promotion service 88 are each depicted as a single component, the functionality implemented by the quantum simulator 80 and the promotion service 88 may be implemented in any number of components, and the examples discussed herein are not limited to any particular number of components.

Figure 2A:
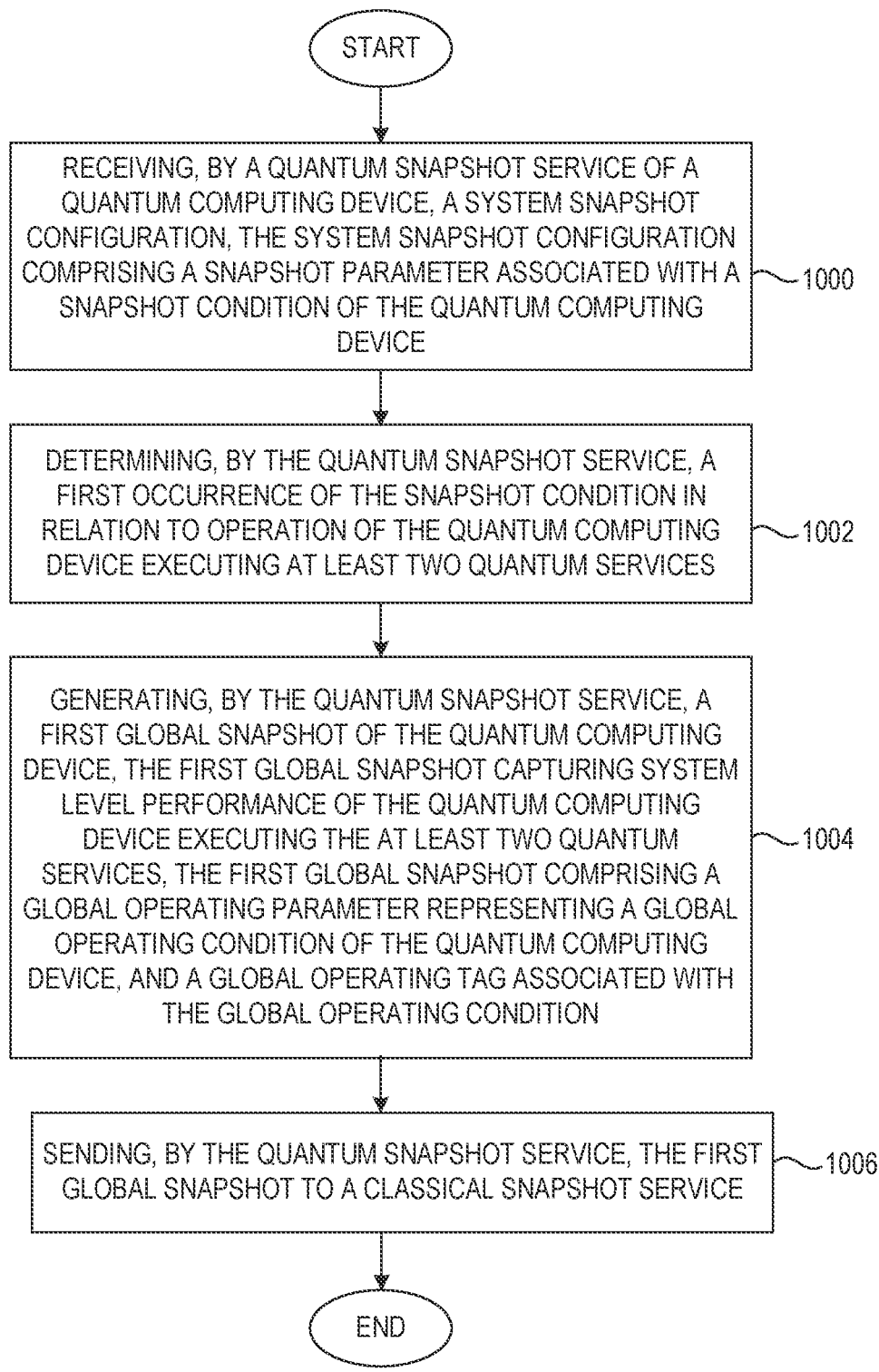
FIG. 2A is a flowchart of a method for capturing a global snapshot of a quantum computing device according to one example.

FIG. 2A is a flowchart of a method for capturing a global snapshot 40 of a quantum computing device 20 according to one example. FIG. 2A will be discussed in conjunction with FIG. 1A. A quantum snapshot service 30 of a quantum computing device 20 receives a system snapshot configuration 36 (1000). The system snapshot configuration 36 includes a snapshot parameter 38 associated with a snapshot condition of the quantum computing device 20. The quantum snapshot service 30-S determines a first occurrence of the snapshot condition in relation to operation of the quantum computing device 20 executing at least two quantum services 30 (1002). The quantum snapshot service 30-S generates a first global snapshot 40 of the quantum computing device 20 (1004). The first global snapshot 40 captures system level performance of the quantum computing device 20 executing the at least two quantum services 30. The first global snapshot 40 includes a global operating parameter 42 representing a global operating condition of the quantum computing device 20. The first global snapshot 40 further includes a global operating tag 46 associated with the global operating condition. The quantum snapshot service 30-S sends the first global snapshot 40 to a classical snapshot service 50 (1006).

Figure 2B:
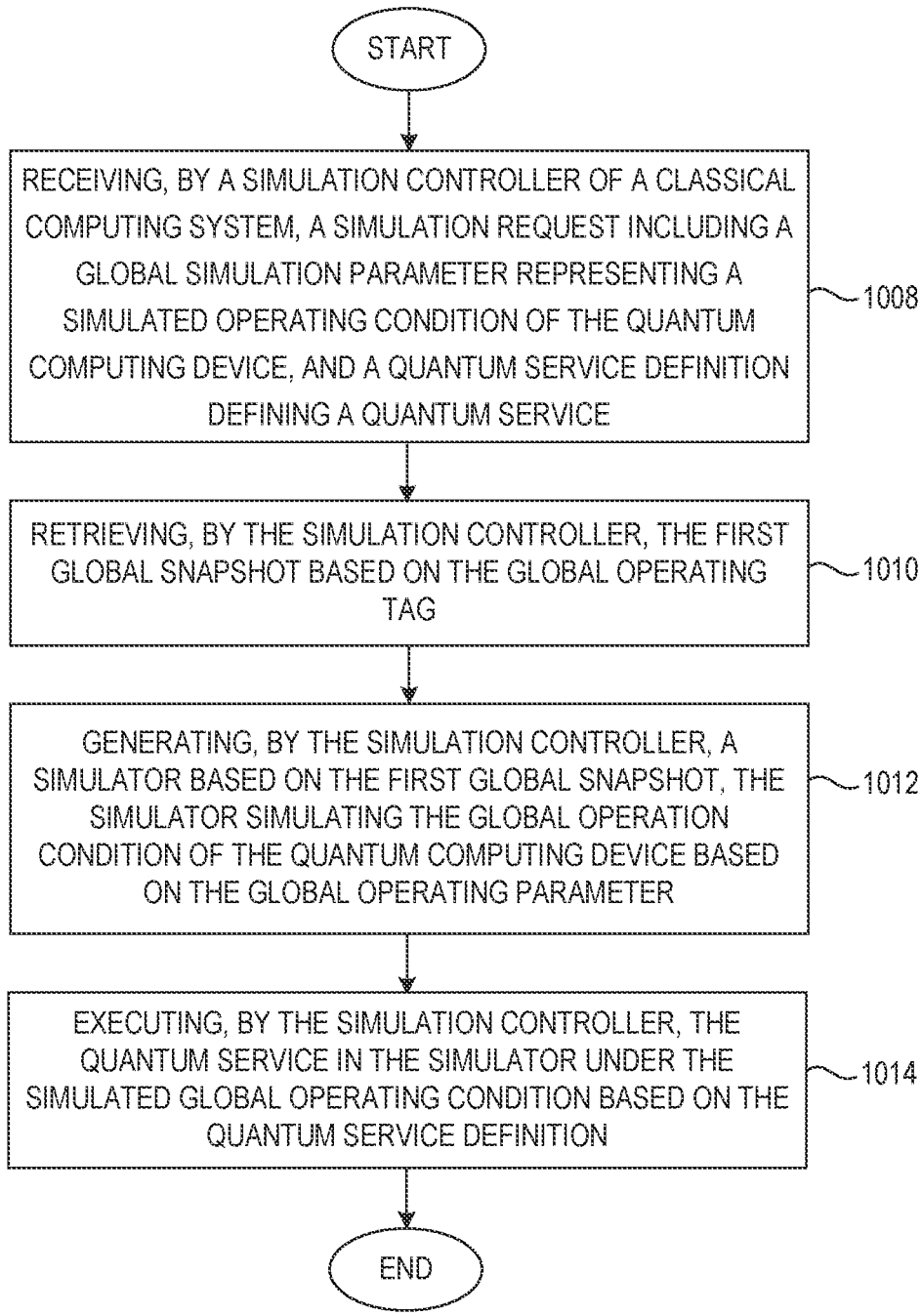
FIG. 2B is a flowchart of a method for using a quantum simulator based on a global snapshot of a quantum computing device according to one example.

FIG. 2B is a flowchart of a method for using a quantum simulator 80 based on a global snapshot 40 of a quantum computing device 20 according to one example. FIG. 2B will be discussed in conjunction with FIGS. 1A and 1B. A simulation controller 74 of a classical computing system receives a simulation request 70 (1008). The simulation request 70 includes a global simulation parameter 72 representing a simulated operating condition of the quantum computing device 20. The simulation request 70 further includes a quantum service definition 66 defining a quantum service 30. The simulation controller 74 retrieves the global snapshot 40 based on the global operating tag 46 (1010). The simulation controller 74 generates a quantum simulator 80 based on the global snapshot 40 (1012). The quantum simulator 80 simulates the global operation condition of the quantum computing device 20 based on the global operating parameter 42. The quantum simulator 80 executes the quantum service 30 in the quantum simulator 80 under the simulated global operating condition based on the quantum service definition 66 (1014).

Figure 3:
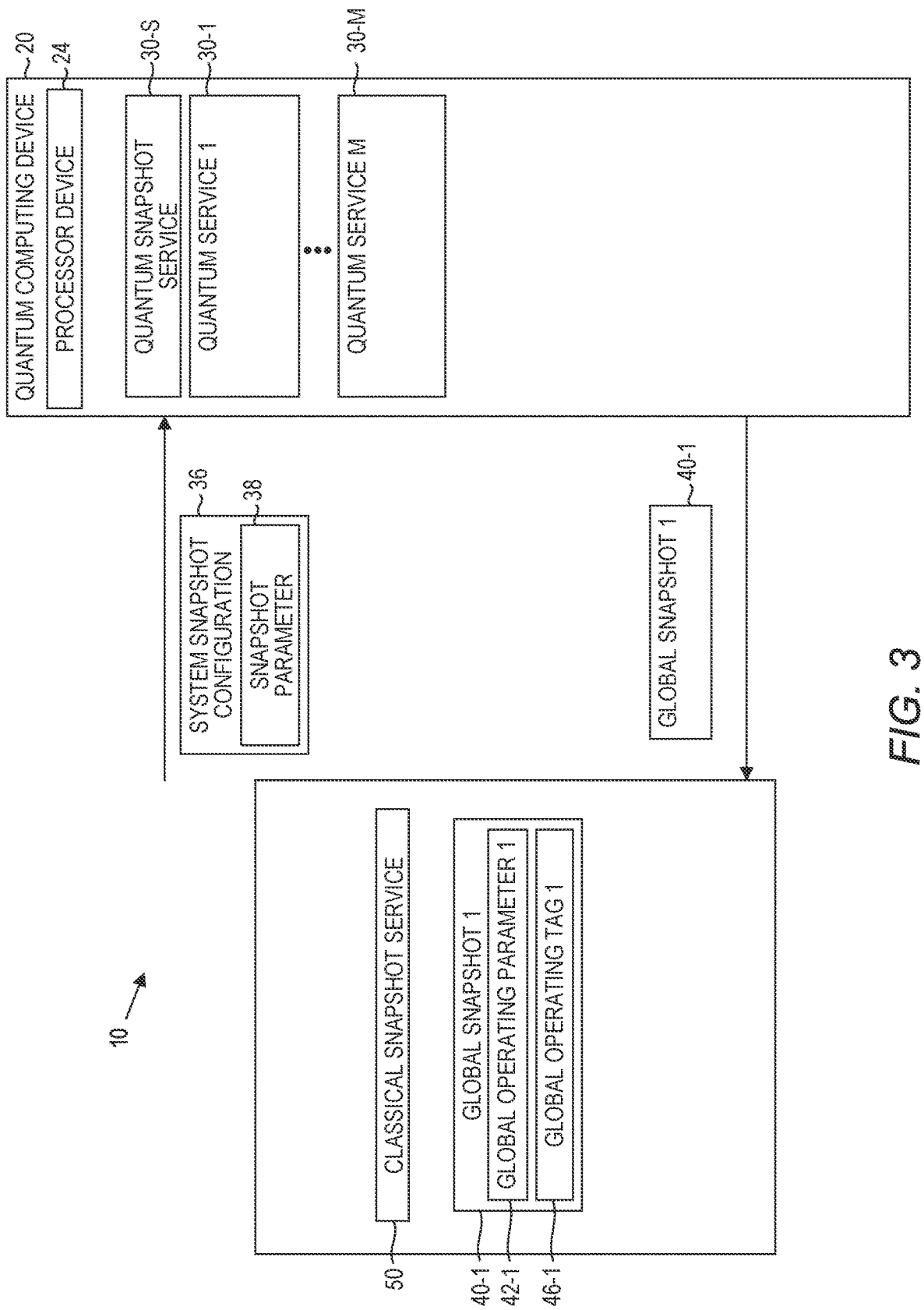
FIG. 3 is a simplified block diagram of the processor device illustrated in FIG. 1A according to one implementation.

FIG. 3 is a simplified block diagram of the computing system 10 illustrated in FIG. 1A according to one implementation. In this example, the system includes a quantum computing device 20 with a processor device 24. The quantum snapshot service 30-S of a quantum computing device 20 receives a system snapshot configuration 36. The system snapshot configuration 36 includes a snapshot parameter 38 associated with a snapshot condition of the quantum computing device 20. The quantum snapshot service 30-S determines a first occurrence of the snapshot condition in relation to operation of the quantum computing device 20 executing at least two quantum services 30. The quantum snapshot service 30-S generates a first global snapshot 40-1 of the quantum computing device 20. The first global snapshot 40-1 captures system level performance of the quantum computing device 20 executing the at least two quantum services. The first global snapshot 40-1 includes a global operating parameter 42-1 representing a global operating condition of the quantum computing device 20. The first global snapshot 40-1 further includes a global operating tag 46-1 associated with the global operating condition. The quantum snapshot service 30-S sends the first global snapshot 40-1 to a classical snapshot service 50.

Figure 4:
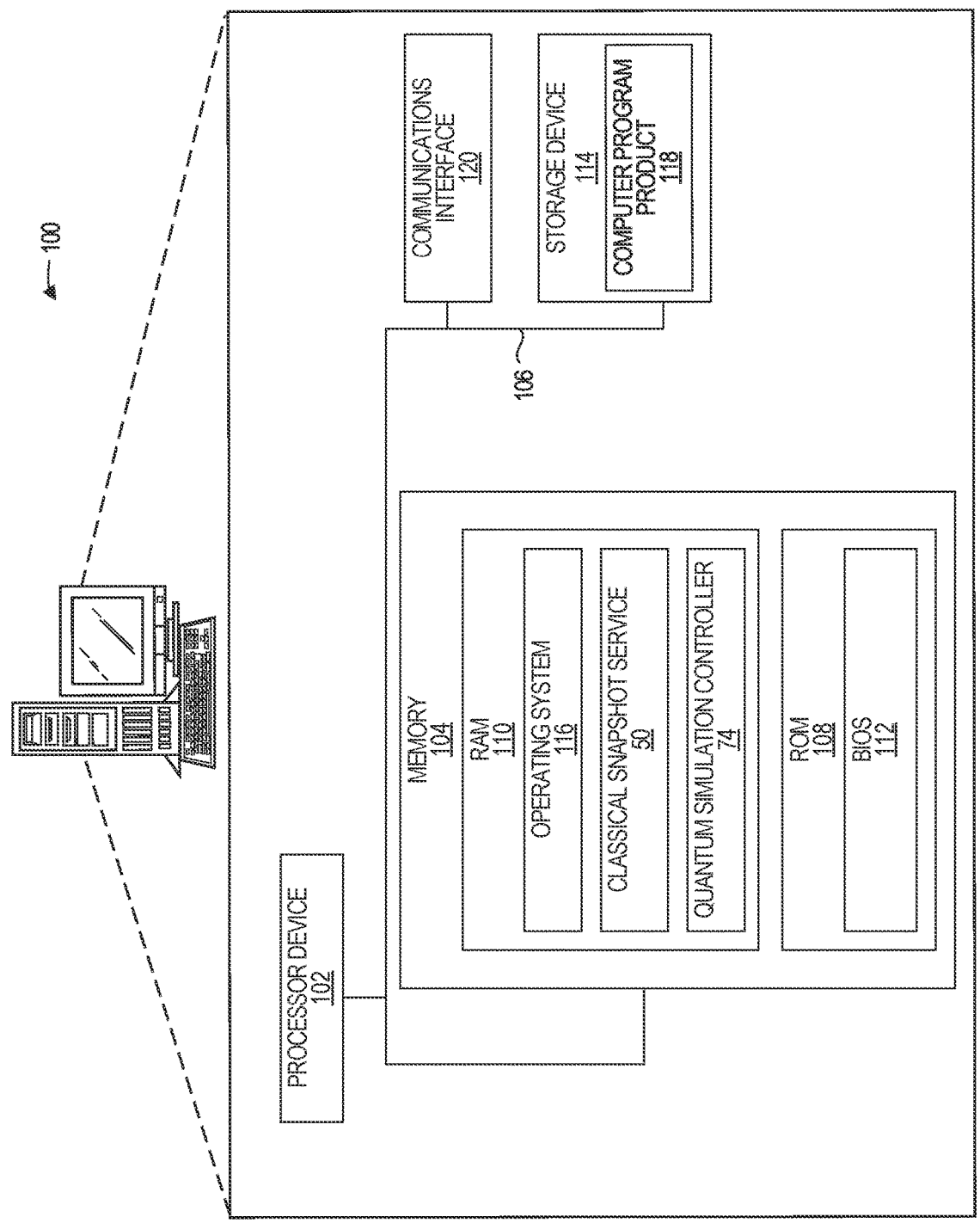
FIG. 4 is a block diagram of a computing device suitable for implementing one or more of the processing devices disclosed herein, according to one implementation.

FIG. 4 is a block diagram of a computing device 100 containing components suitable for implementing any of the processing devices disclosed herein. The computing device 100 includes a processor device 102, a system memory 104, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help transfer information between elements within the computing device 100. The volatile memory 110 may also include a high-speed RAM, such as static RAM, for caching data.

The computing device 100 may further include or be coupled to a non-transitory computer-readable storage medium such as storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, which may implement the functionality described herein in whole or in part. All or a portion of the examples herein may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the network manager in the volatile memory 110, may serve as a controller or control system for the computing device 100 that is to implement the functionality described herein.

The computing device 100 may also include one or more communication interfaces 120, depending on the particular functionality of the computing device 100. The communication interfaces 120 may comprise one or more wired Ethernet transceivers, wireless transceivers, fiber, satellite, and/or coaxial interfaces by way of non-limiting examples.

Figure 5:
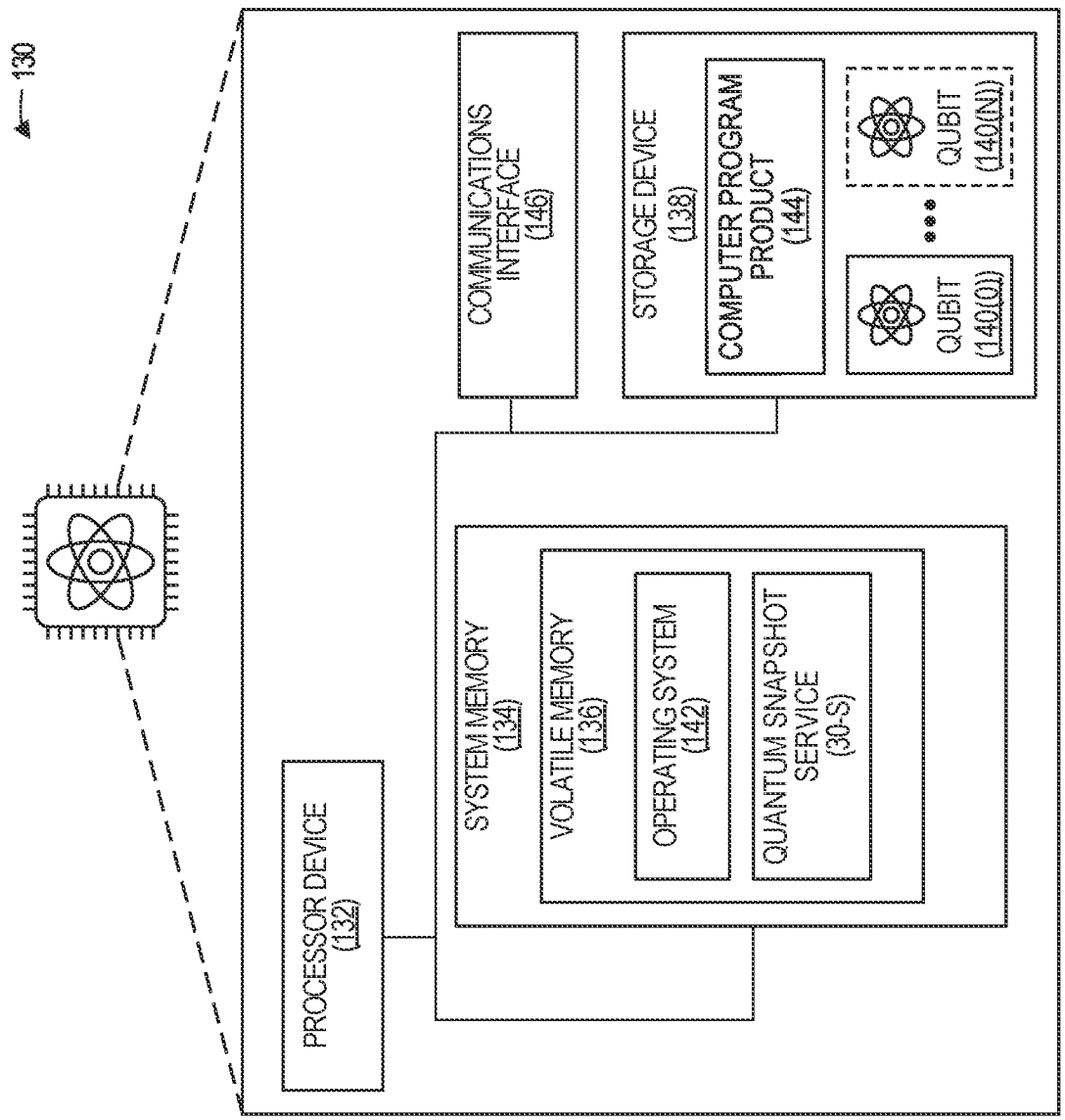
FIG. 5 is a block diagram of a quantum computing device suitable for implementing examples, according to one example.

FIG. 5 is a block diagram of a quantum computing device 130, such as the quantum computing device 20 of FIGS. 1A-1B, suitable for implementing examples according to one example. The quantum computing device 130 may comprise any suitable quantum computing device or devices. The quantum computing device 130 can operate using classical computing principles or quantum computing principles. When using quantum computing principles, the quantum computing device 130 performs computations that utilize quantum-mechanical phenomena, such as superposition and entanglement. The quantum computing device 130 may operate under certain environmental conditions, such as at or near zero degrees (0°) Kelvin. When using classical computing principles, the quantum computing device 130 utilizes binary digits that have a value of either zero (0) or one (1).

The quantum computing device 130 includes a processor device 132 and a system memory 134. The processor device 132 can be any commercially available or proprietary processor suitable for operating in a quantum environment. The system memory 134 may include volatile memory 136 (e.g., random-access memory (RAM)). The quantum computing device 130 may further include or be coupled to a non-transitory computer-readable medium such as a storage device 138. The storage device 138 and other drives associated with computer-readable media and computer-usable media may provide non-volatile storage of data, data structures, computer-executable instructions, and the like. The storage device may also provide functionality for storing one or more qubits 140(0)-140(N).

A number of modules can be stored in the storage device 138 and in the volatile memory 136, including an operating system 142 and one or more modules. All or a portion of the examples may be implemented as a computer program product 144 stored on a transitory or non-transitory computer-usable or computer-readable medium, such as the storage device 138, which includes complex programming instructions, such as complex computer-readable program code, to cause the processor device 132 to carry out the steps described herein. Thus, the computer-readable program code can comprise computer-executable instructions for implementing the functionality of the examples described herein when executed on the processor device 132.

An operator may also be able to enter one or more configuration commands through a keyboard (not illustrated), a pointing device such as a mouse (not illustrated), or a touch-sensitive surface such as a display device (not illustrated). The quantum computing device 130 may also include a communications interface 146 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum snapshot service of a quantum computing device, a system snapshot configuration, the system snapshot configuration comprising a snapshot parameter associated with a snapshot condition of the quantum computing device;
   determining, by the quantum snapshot service, a first occurrence of the snapshot condition in relation to operation of the quantum computing device executing at least two quantum services;
   generating, by the quantum snapshot service, a first global snapshot of the quantum computing device, the first global snapshot capturing system level performance of the quantum computing device executing the at least two quantum services, the first global snapshot comprising:
      a global operating parameter representing a global operating condition of the quantum computing device; and
      a global operating tag associated with the global operating condition; and
   sending, by the quantum snapshot service, the first global snapshot to a classical snapshot service.

2. The method of claim 1, wherein receiving, by the quantum snapshot service of the quantum computing device, the system snapshot configuration, the system snapshot configuration comprising the snapshot parameter associated with the snapshot condition of the quantum computing device further comprises:
   receiving, by the quantum snapshot service of the quantum computing device, the system snapshot configuration, the system snapshot configuration comprising the snapshot parameter associated with the snapshot condition of the quantum computing device, the snapshot parameter comprises at least one of a time, time period, processing load, qubit usage, operating temperature, or application queue.

3. The method of claim 1, further comprising determining, by the quantum snapshot service, whether a snapshot can be taken by interrogating a qubit registry.

4. The method of claim 3, wherein determining, by the quantum snapshot service, whether a snapshot can be taken by interrogating the qubit registry further comprises at least one of:
   determining entanglement status of qubits of the quantum computing device;
   determining service ownership of qubits of the quantum computing device; or
   determining current usage of qubits of the quantum computing device.

5. The method of claim 1, wherein the global operating parameter representing the global operating condition of the quantum computing device further comprises:
   at least one of a memory usage indicator that indicates memory usage, a processor usage indicator that indicates processor usage, one or more qubit identifiers corresponding to one or more qubits, or one or more qubit data values corresponding to the one or more qubits.

6. The method of claim 1, further comprising:
   determining, by the quantum snapshot service, a second occurrence of the snapshot condition in relation to operation of the quantum computing device executing the at least two quantum services;
   generating, by the quantum snapshot service, a second global snapshot of the quantum computing device; and
   sending, by the quantum snapshot service, the second global snapshot to the classical snapshot service.

7. The method of claim 1, wherein the global operating tag associated with the global operating condition further comprises:
   a plurality of global operating tags associated with the global operating condition.

8. The method of claim 1, wherein the global operating tag associated with the global operating condition further comprises:
   at least one of a time, time period, low processing load, high processing load, low qubit usage, high qubit usage, low operating temperature, high operating temperature, low application queue, or high application queue.

9. The method of claim 1, wherein sending, by the quantum snapshot service, the first global snapshot to the classical snapshot service further comprises:
sending, by the quantum snapshot service, the first global snapshot to the classical snapshot service, the first global snapshot comprising at least one of an XML (Extensible Markup Language) file, a YAML (YAML Ain't Markup Language) file, or a JSON (JavaScript Object Notation) file.

10. The method of claim 1, wherein generating, by the quantum snapshot service, the first global snapshot of the quantum computing device further comprises at least one of:
receiving the global operating parameter from a quantum task manager of the quantum computing device; or
receiving the global operating parameter via a hardware application programming interface (API) of the quantum computing device.

11. The method of claim 1, further comprising:
receiving, by a simulation controller of a classical computing system, a simulation request including:
a global simulation parameter representing a simulated operating condition of the quantum computing device; and
a quantum service definition defining a quantum service;
retrieving, by the simulation controller, the first global snapshot based on the global operating tag;
generating, by the simulation controller, a quantum simulator based on the first global snapshot, the quantum simulator simulating the global operation condition of the quantum computing device based on the global operating parameter; and
executing, by the simulation controller, the quantum service in the quantum simulator under the simulated global operating condition based on the quantum service definition.

12. The method of claim 11, wherein the simulation request including the global simulation parameter representing the global operating condition of the quantum computing device further comprises:
a plurality of global simulation parameters representing one or more global operating conditions of the quantum computing device.

13. The method of claim 11, wherein the quantum service definition defining the quantum service further comprises:
a Quantum Assembly Language (QASM) file that defines the quantum service.

14. The method of claim 13, further comprising:
receiving, by the simulation controller, simulation results of executing the quantum service in the quantum simulator;
sending, by the simulation controller, the simulation results to a user over a network.

15. The method of claim 11, wherein retrieving, by the simulation controller, the global snapshot based on the global operating tag further comprises:
retrieving, by the simulation controller, the first global snapshot and a second global snapshot based on the global operating tag.

16. The method of claim 15, wherein generating, by the simulation controller, the quantum simulator based on the global snapshot, the quantum simulator simulating the global operation condition of the quantum computing device based on the global operating parameter further comprises:

generating, by the simulation controller, the quantum simulator based on the first global snapshot and the second global snapshot, the quantum simulator simulating the global operation condition of the quantum computing device based on a first global operating parameter of the first global snapshot and a second global operating parameter of the second global snapshot.

17. The method of claim 16, wherein generating, by the simulation controller, the quantum simulator based on the global snapshot, the quantum simulator simulating the global operation condition of the quantum computing device based on the global operating parameter further comprises:
generating, by the simulation controller, a first quantum simulator based on the first global snapshot, the first quantum simulator simulating a first global operation of the quantum computing device based on a first global operating parameter of the first global snapshot; and
generating, by the simulation controller, a second quantum simulator based on the second global snapshot, the second quantum simulator simulating a second global operation of the quantum computing device based on a second global operating parameter of the second global snapshot.

18. The method of claim 17, further comprising:
receiving, by the simulation controller, first simulation results of executing the quantum service in the first quantum simulator;
receiving, by the simulation controller, second simulation results of executing the quantum service in the second quantum simulator;
generating, by the simulation controller, a simulation results package including the first simulation results and the second simulation results; and
sending, by the simulation controller, the simulation results package to a user over a network.

19. A system, comprising:
a quantum computing device comprising a processor device to:
receive, by a quantum snapshot service of the quantum computing device, a system snapshot configuration, the system snapshot configuration comprising a snapshot parameter associated with a snapshot condition of the quantum computing device;
determine, by the quantum snapshot service, a first occurrence of the snapshot condition in relation to operation of the quantum computing device executing at least two quantum services;
generate, by the quantum snapshot service, a first global snapshot of the quantum computing device, the first global snapshot capturing system level performance of the quantum computing device executing the at least two quantum services, the first global snapshot comprising:
a global operating parameter representing a global operating condition of the quantum computing device; and
a global operating tag associated with the global operating condition; and
send, by the quantum snapshot service, the first global snapshot to a classical snapshot service.

20. A computer program product stored on a non-transitory computer-readable storage medium and including instructions to cause a processor device to:
receive, by a quantum snapshot service of a quantum computing device, a system snapshot configuration, the system snapshot configuration comprising a snapshot parameter associated with a snapshot condition of the quantum computing device;

determine, by the quantum snapshot service, a first occurrence of the snapshot condition in relation to operation of the quantum computing device executing at least two quantum services;

generate, by the quantum snapshot service, a first global snapshot of the quantum computing device, the first global snapshot capturing system level performance of the quantum computing device executing the at least two quantum services, the first global snapshot comprising:

a global operating parameter representing a global operating condition of the quantum computing device; and a global operating tag associated with the global operating condition; and send, by the quantum snapshot service, the first global snapshot to a classical snapshot service.

* * * * *